April 8, 1930. G. CALVINO 1,754,146
COFFEE FILTER
Filed Sept. 13, 1928

Inventor
Giovanni Calvino

By Emil Bönnelycke
Attorney

Patented Apr. 8, 1930

1,754,146

UNITED STATES PATENT OFFICE

GIOVANNI CALVINO, OF MILAN, ITALY

COFFEE FILTER

Application filed September 13, 1928, Serial No. 305,697, and in Italy January 31, 1928.

This invention applies to coffee filters into which boiling water is poured and which are of the type essentially comprising a cylindrical vessel having a perforated fixed bottom on which the pulverized coffee is deposited and upon which a removable perforated disc is placed, the boiling water then being poured on the top of the latter. Filters of this character for domestic use have, generally, the disadvantage that when the coffee is not compressed, water passes through it too freely, without dissolving and collecting all the aromatic ingredients of the coffee; whereas, when the coffee is compressed too much, the water has difficulty in passing through it and requires too long to filter.

Such implements have been substituted in certain cases by others which act under steam pressure; but the latter implements, however, require a boiler attached to them. In some cases the boiler has been replaced by a plunger or piston, for instance, which creates an air pressure; such plunger usually being separate from the filter and provided with devices which prevent boiling water from being poured directly into the filter as proposed in the present case.

The object of the invention is a coffee filter of the type first mentioned, in which boiling water is simply poured into the filter and is caused to pass rapidly through the layer of coffee and the perforated bottom. It is characterized by the use of a piston device which, during its descent, creates the necessary pressure on the boiling water, said piston forming part of the cover of the filter and being removable with it so as to allow the filter to be charged with pulverized coffee and boiling water to be poured over it. The invention has also other characteristic features which render its construction eminently practical.

Figure 1:
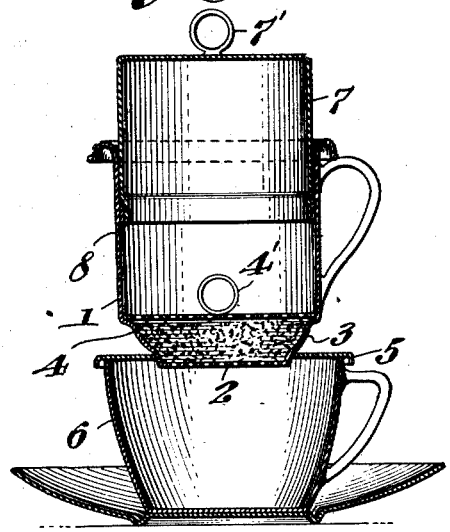
Figure 2:
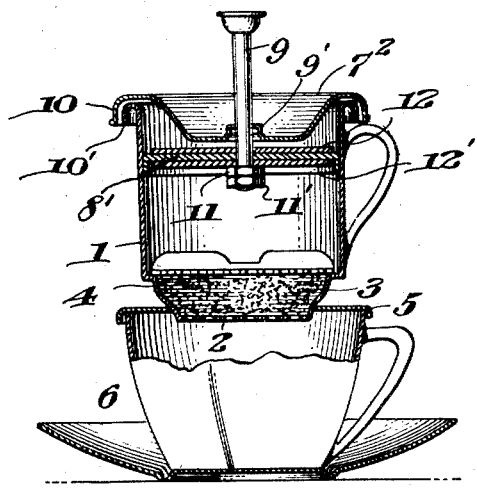

In the accompanying drawing,

Figures 1 and 2 are side views, with parts broken away and in section, of two different forms of the invention applied to a single-cup filter; but the invention is obviously not limited to the forms illustrated but can be applied to any implement or machine not equipped with a boiler for creating the desired pressure.

According to the invention, the filter comprises a cylindrical vessel 1 having a perforated bottom 2 whereon the pulverized coffee 3 is deposited; a removable perforated disc 4 being placed on top of the coffee. The filter is adapted to be supported on and above the cup 6 to be filled, preferably by means of a ring 5 that fits over the rim or edge of the cup.

The filter body or vessel 1 is provided at its top with a closure or cover which is removable therefrom to permit the introduction of the coffee and water and also the insertion of the previously-mentioned piston which is utilized to exert pressure upon the air contained in the vessel above the water so as to force the latter through the coffee.

In the form represented in Fig. 1, the piston consists of a cylindrical body 7 provided at its lower edge with a packing ring 8 and at its top with a lifting or operating element 7', here shown as a hinged ring which can be swung over to one side so as to rest upon the top face of the piston; said face preferably being dished or recessed to receive the ring therein, leaving the face itself level. The perforated disc 4 is similarly provided with a lifting ring 4' which can be folded over flat upon the disc to avoid interfering with the full stroke of the piston. The packing ring 8 makes airtight contact with the inner surface of the vessel 1, as will be understood.

The preferred form of the invention is that illustrated in Fig. 2, in which the piston 9 is structurally separate from and movable relatively to the cover $7^2$ of the filter, whereas in Fig. 1 they are integral. The aforesaid cover $7^2$ is provided with a guide 9' through which the stem of the piston moves, and it is dished to receive the stem end or head and maintain it below the edge of the filter. The latter has its edge turned outward and downward to form a flange 10', and the cover $7^2$ has its edge similarly shaped to form a flange 10 that fits conformably over the first-named edge.

The packing in this form consists of a yielding disc 8' which is clamped between two metal plates 12, 12' which are mounted on the piston stem and secured thereto by nuts 11 and 11'. The packing disc is large enough to protrude beyond the clamping plates and wipe against the inner wall of vessel 1 as shown, thus providing the required air-tightness when the piston is moved downward or inward of the vessel but permitting an easy upward or outward movement of the piston.

What I claim is:

1. A coffee filter, comprising a cylindrical vessel with a perforated fixed bottom whereon pulverized coffee is deposited; a removable perforated disc deposited on top of the coffee and whereon boiling water is poured; and an imperforate piston removably fitting in said vessel above the water and having an airtight sliding engagement with the inner surface of the side wall of the vessel; said piston adapted to be removed from the vessel to enable the introduction of the coffee, the removable perforated disc and water, and then reinserted into and moved downward toward the water to force the latter through the coffee and discharge it through the perforated fixed bottom of the vessel.

2. A coffee filter, comprising a cylindrical vessel provided with a perforated fixed bottom whereon pulverized coffee is deposited; a removable perforated disc deposited on top of the coffee and whereon boiling water is poured; a removable cover for the vessel; and an imperforate piston carried by and movable relatively to the cover; said plunger being adapted to be removed with the cover from the vessel to enable the introduction of the coffee, the removable perforated disc and water, and then reinserted thereinto and moved downward toward the water in airtight sliding engagement with the inner wall of the vessel, to force the water through the coffee and discharge it through the perforated fixed bottom of the vessel.

3. A coffee filter, according to claim 2, in which the cover has a recess to receive the end of the piston stem; when said piston is in fully-lowered position; said cover also having a guide opening through which the piston stem is guided.

In testimony whereof I affix my signature.

GIOVANNI CALVINO.